(12) United States Patent
Seidler et al.

(10) Patent No.: US 7,884,503 B2
(45) Date of Patent: Feb. 8, 2011

(54) METHOD AND ARRANGEMENT FOR HARMONIC-WAVE SUPPRESSION FOR AC VOLTAGE-OPERATED PTC HEATERS

(75) Inventors: Klaus Seidler, Uetersen (DE); Joerg Engelhardt, Hamburg (DE)

(73) Assignee: ESW GmbH, Wedel (DE)

( * ) Notice: Subject to any disclaimer, the term of this patent is extended or adjusted under 35 U.S.C. 154(b) by 480 days.

(21) Appl. No.: 12/047,815

(22) Filed: Mar. 13, 2008

(65) Prior Publication Data

US 2008/0309168 A1 Dec. 18, 2008

(30) Foreign Application Priority Data

Mar. 14, 2007 (DE) .................. 10 2007 012 699

(51) Int. Cl.
*H02J 1/02* (2006.01)
(52) U.S. Cl. ................. 307/105; 363/39; 219/504
(58) Field of Classification Search ............... 307/105; 363/39; 219/504
See application file for complete search history.

(56) References Cited

U.S. PATENT DOCUMENTS

| | | | |
|---|---|---|---|
| 4,075,632 A * | 2/1978 | Baldwin et al. ............ 342/51 |
| 4,119,907 A | 10/1978 | Quinn | |
| 5,751,138 A | 5/1998 | Venkata et al. | |
| 7,546,092 B1 * | 6/2009 | Murdoch ................ 455/82 |
| 7,711,332 B2 * | 5/2010 | Murdoch ................ 455/107 |
| 2006/0034365 A1 | 2/2006 | Song et al. | |
| 2006/0286938 A1 * | 12/2006 | Murdoch ................ 455/73 |

FOREIGN PATENT DOCUMENTS

| | | |
|---|---|---|
| EP | 0 663 713 A1 | 7/1995 |
| JP | 62194521 AA | 8/1987 |

* cited by examiner

*Primary Examiner*—Hal I Kaplan
(74) *Attorney, Agent, or Firm*—Duane Morris LLP

(57) ABSTRACT

The invention relates to a method and to an arrangement for harmonic-wave suppression in AC voltage-operated PTC heaters, especially in frequency-stable and frequency-variable alternating-voltage networks in aerospace applications. The problem of harmonic-wave suppression for AC voltage-operated PTC heaters, in which the harmonic waves are suppressed by superimposing a correction current, which permits a simple and economical generation of the harmonic-wave suppression signal, is solved according to the invention by generating a correction current in a correction current circuit arranged parallel to the PTC heater using an ohmic resistor (4). The correction current is generated and additively superimposed exclusively for suppressing the third harmonic of the heating current of the PTC heater.

10 Claims, 3 Drawing Sheets

METHOD AND ARRANGEMENT FOR HARMONIC-WAVE SUPPRESSION FOR AC VOLTAGE-OPERATED PTC HEATERS

FIELD OF THE INVENTION

The invention relates to a method and an arrangement for harmonic-wave suppression for AC voltage-operated PTC heaters, in which the harmonic waves are compensated by superimposing a current generated inverted relative to the harmonic-wave component, especially for heating elements in frequency-stable and frequency-variable alternating-voltage networks for aerospace applications.

BACKGROUND OF THE INVENTION

For heating in mobile devices (motor vehicles, airplanes, etc.), electrically operated ceramic heating elements with a positive temperature coefficient (PTC) are increasingly being used. The growing interest in such PTC heaters is notable, because it features self-limiting of the heater temperature based on the positive thermal coefficient and it results in self-regulation of the supplied and emitted power.

From a physical point of view, PTC heaters have temperature-dependent and voltage-dependent resistance characteristics. While the temperature-dependent characteristic is desired due to the temperature-limiting self-regulation, the voltage-dependent characteristic is frequently not desired, because it leads to a distortion factor that cannot be tolerated for sensitive fields of use, e.g., aerospace applications.

For such applications of PTC heaters, there is a need to limit the disruptive harmonic waves and thus the distortion factor to a permissible level.

In the prior art, it is known to suppress undesirably high harmonic-wave components by means of passive LC filters or active inverter circuits. In particular, in frequency-variable supply networks, such solutions, however, lead to an expensive circuit with respect to weight, volume, and cost.

Furthermore, in U.S. Pat. No. 5,751,138 a circuit for compensating harmonic-wave noise in a network voltage system is described, in which a pulse width-modulated inverter is controlled for each network phase, in order to generate a harmonic-wave compensation signal, which is coupled into an impedance coil. The impedance coil is arranged in series between a square-wave inverter and a respective phase, with the square-wave inverter generating a current that compensates in phase opposition the reactive impedance of the load in the respective phase of the current path. In this way, the square-wave inverter is decoupled from the pulse width-modulated inverter and is to be operated at a frequency that is considerably higher than the base frequency, so that just the voltage supply for this signifies an unjustifiably high expense.

Furthermore, circuits for reducing harmonic-wave components of the output signal are known from digital audio amplifiers. Such a digital, adaptive, feedback harmonic-wave compensation for digitally controlled power stages is described in US Published Application 2006/0034365 A1, in which an opposite-phase signal for compensating the harmonic waves is added to the input signal in an actively controlled way. The magnitude and phase of the harmonic waves are here determined by a digital pick-up circuit from the input variables of modulation degree, magnitude of the input signal, and time-error statistics of various power components and thus exceed the expense in terms of weight, installation space, and costs permissible for components, in particular, in aerospace applications.

The invention is based on the problem of finding a new possibility for harmonic-wave suppression for AC voltage-operated PTC heaters, in which the harmonic waves are compensated by superimposing a current generated inverted relative to the harmonic-wave component and which allow a simple and economical generation of the harmonic-wave suppression signal.

SUMMARY

According to the invention, the objective of providing a method for harmonic-wave suppression in AC voltage-operated PTC heaters, in which the harmonic waves are compensated by superimposing a current generated inverted to the harmonic-wave component, is achieved in that the correction current is generated in a correction current circuit parallel to the PTC heater by means of an ohmic resistor, with the correction current being generated and superimposed in an additive way modulated to the suppression of the third harmonic of the heating current of the PTC heater.

Advantageously, the correction current for suppressing the third harmonic of the PTC heater current is modulated from the nominal voltage of the load current circuit.

Preferably, the instantaneous value of the voltage of the load current circuit for modulating the correction current in a correction current circuit is used for this purpose.

In an especially advantageous construction of the invention, the instantaneous value of the voltage of the load current circuit is determined in a parallel branch to the PTC heater by means of voltage dividers and comparators and thus the correction current is modulated by means of a current regulator in the correction current circuit.

The correction current for suppressing third harmonics of the PTC heater current can also be determined preferably from the instantaneous values of the voltage and current of the load current circuit in a parallel branch to the PTC heater and modulated by means of a current regulator in the correction current circuit, wherein the current values are measured by means of a current sensor arranged after the correction current circuit in the load current circuit.

In an expanded construction of the invention for the complete compensation of the harmonic waves of the heating current, the correction current is determined from the instantaneous values of the voltage and the analysis of the actual harmonic-wave components of the load current circuit in a parallel branch to the PTC heater and is modulated by means of a current regulator in the correction current circuit, wherein the harmonic wave components are determined by programmable, active components arranged after the correction current circuit in the load current circuit.

The problem of the invention is solved, furthermore, in an arrangement for harmonic-wave suppression in AC voltage-operated PTC heaters, in which a PTC heater is arranged in the load current circuit of an alternating-voltage source, in that a correction current circuit arranged parallel to the PTC heater is provided with an ohmic resistor for generating a controllable correction current, and that a current modulation is adjusted by means of the resistor for generating the controllable correction current, such that the third harmonic of the heating current of the PTC heater is suppressed.

For controlling the correction current by means of the resistor, advantageously a modulation unit is arranged in a parallel branch to the PTC heater and to the correction current circuit, in which the third harmonic of the heating current of the PTC heater can be generated on the basis of a voltage measurement in the load current circuit and the correction current is controlled by means of the resistor in the correction current circuit by means of a current regulator.

Here, the modulation unit advantageously has voltage dividers arranged staggered as well as comparators coupled to these dividers, in order to generate approximately the third harmonic of the heating current from the voltage in the load current circuit.

To achieve more exact compensation of the 3rd harmonic, for controlling the correction current by means of the resistor of the correction current circuit, a modulation unit, in which the third harmonic of the PTC heater current can be generated on the basis of an on-going determination of the instantaneous values of voltage and current in the load current circuit, is arranged preferably in a parallel branch to the PTC heater and to the correction current circuit, with a current sensor for current measurement being arranged after the correction current circuit in the load current circuit.

In this way, the modulation unit preferably has n staggered voltage dividers, as well as comparators coupled to these dividers, for voltage measurement and also a separate current sensor arranged after the correction current circuit in the load current circuit, in order to more exactly compensate the third harmonic of the PTC heater current through tracking by means of the current regulator in the correction current circuit.

In an expanded modification of the invention, the modulation unit advantageously has additional, active signal-processing components arranged after the correction current circuit in the load current circuit for analyzing the actual harmonic-wave components of the PTC heater current, in order completely to compensate all of the harmonic waves of the PTC heater current through regulation by means of the current regulator in the correction current circuit.

The invention is based on the basic consideration that the generation of the harmonic-wave compensation through active or passive filter circuits is too expensive with respect to weight and space requirements. However, as a result of Fourier analysis of the PTC heater current, it was found that, surprisingly, for PTC heaters the main component of the harmonic waves generating the distortion factor can be represented as the 3rd harmonic of the heating current of the PTC heater with 180° phase shift relative to the fundamental wave.

The solution approach according to the invention can be selected so that the current generated by a PTC heater is measured, subtracted from a sinusoidal current with equal peak value and the resulting differential current is fed phase-corrected as a correction current with equal polarity in the current of the PTC heater, so that the determined harmonic-wave noise is equalized or at least considerably reduced.

In an especially simple construction, a modulated current (correction current) is generated by a resistor load lying parallel to the PTC heater as a result of a voltage modulation and superimposed on the PTC current, so that the interfering 3rd harmonic in the AC voltage network is greatly reduced, the distortion factor is limited to a permissible extent, and thus a nearly sinusoidal output current is generated.

With the arrangement according to the invention, it is possible to achieve harmonic-wave suppression for AC voltage-operated PTC heaters, in which the harmonic waves are compensated by overlapping with a current generated inverted relative to the harmonic-wave component, with the smallest circuit expense. Even for a complete compensation of the 3rd harmonic, the expense for the current measurement then necessary for the exact voltage control of the resistor connected parallel to the PTC load still remains significantly below that of the compensation and filter circuits typical in the state of the art.

BRIEF DESCRIPTION OF THE DRAWINGS

The invention shall be explained in more detail below with reference to certain embodiments. In the drawings.

DESCRIPTION OF EMBODIMENTS OF THE INVENTION

Figure 1:
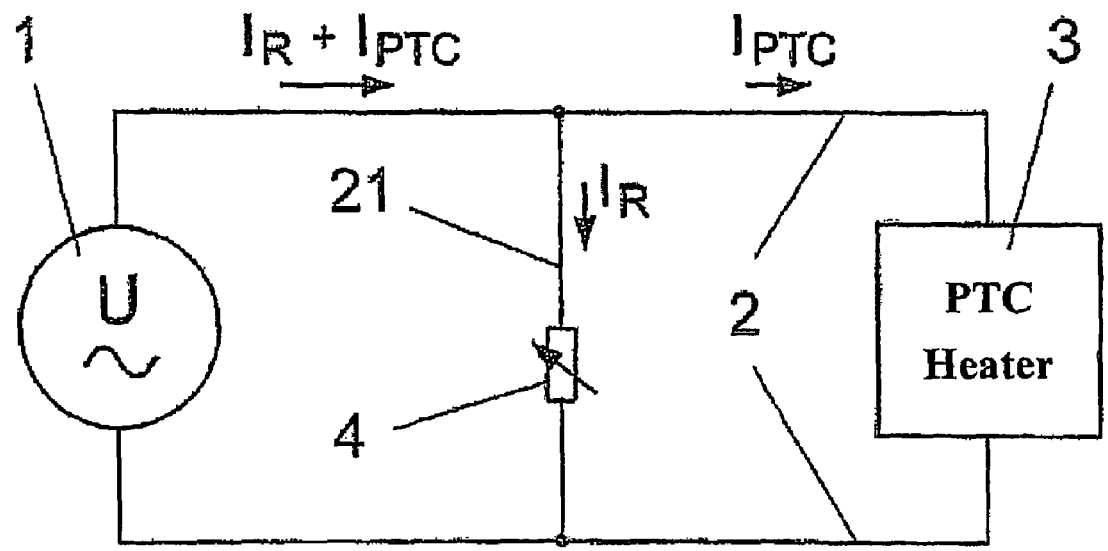
FIG. 1 is a block diagram of the arrangement according to the invention with a correction current circuit controllable by means of an ohmic resistor parallel to the PTC heater.

As schematically illustrated in FIG. 1, an arrangement for suppressing harmonic-wave noise in PTC heaters includes an alternating-voltage source 1, a load current circuit 2, in which a PTC heater 3 is arranged, and also a correction current circuit 21, which is parallel to the PTC heater 3 and which permits a controllable correction current $I_R$ by means of a resistor 4.

Figure 2:
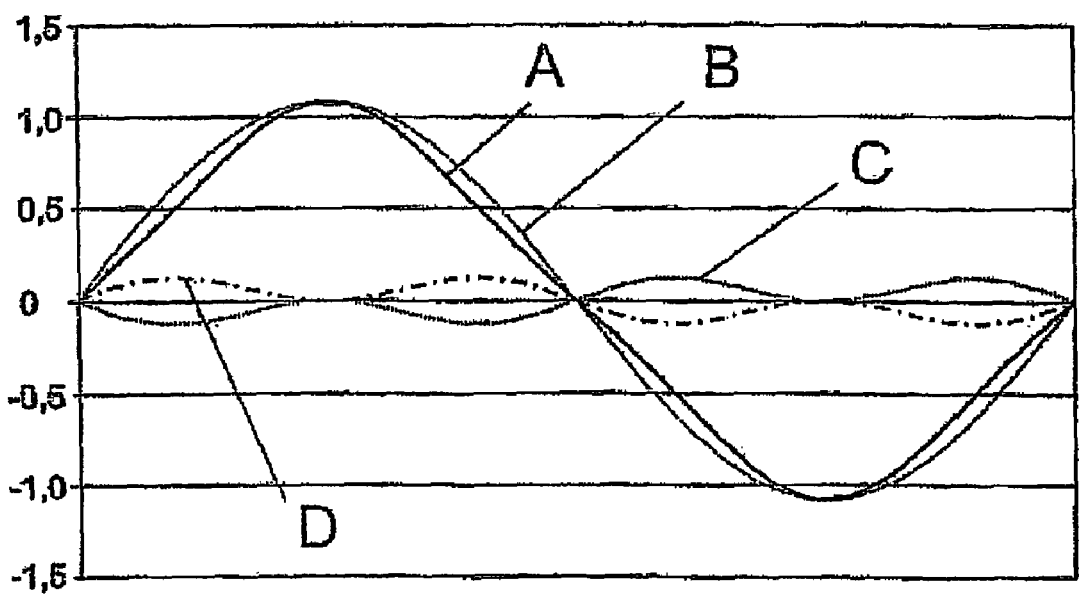
FIG. 2 illustrates the result of a Fourier analysis of the harmonic wave distortion in the PTC load current circuit as a nearly exclusively third harmonic (curve C) of a sine function (curve B), which has the same amplitude as the PTC current.

The physical relationship used here is shown in FIG. 2. In the diagram, the distorted, essentially sinusoidal heating current $I_{PTC}$ of a PTC heater 3 is shown as a solid curve A relative to a pure sine function of equal phase and amplitude (indicated by dashed lines). A Fourier analysis of the PTC heater current $I_{PTC}$ (curve A) produces the dotted curve C, which corresponds surprisingly close to the 3rd harmonic of the sine function (dashed curve B) and is phase-shifted by just 180°, but phase-corrected, relative to both curves A and B.

If the heating current $I_{PTC}$ caused by the PTC heater 3 is subtracted from a sinusoidal current with equal amplitude, as can be seen from FIG. 2, so that the difference with the heating current $I_{PTC}$ is equalized, if a fed correction current $I_R$ (Curve D) with the same polarity corresponds to the phase-corrected, third harmonic of the sine function.

Thus it is possible to generate a correction current $I_R$ that is easy to modulate by means of a purely ohmic load (resistor 4) arranged in parallel to the PTC heater 3.

The current flow across the resistor 4 is here influenced so that in the correction current circuit 21, a modulated correction current $I_R$ flows, which has the same polarity as the heating current $I_{PTC}$ and is produced from an equal-phase sine function with equal amplitude from the subtraction of the heating current $I_{PTC}$. The correction current $I_R$ created in this way is suitable for reducing or completely compensating (according to the expense of an additional heating current analysis) the interfering 3rd harmonic in arbitrary frequency-stable or also frequency-variable alternating-voltage networks, by means of which the distortion factor is limited to a permissible degree or a sinusoidal output current is generated.

The "ohmic losses" on the resistor 4 here can be used as heating power, so that an increased heating power is made available in the sum with the PTC heater 3.

In the block diagram according to FIG. 1, the modulated correction current $I_R$ (in the type of an equivalent circuit diagram) is additively superimposed on the heating current $I_{PTC}$ by means of a controllable ohmic resistor 4, which is arranged in parallel to the PTC heater 3 in the correction current circuit 21.

The modulation of the correction current $I_R$ can be easily derived directly from the instantaneous value of the supply voltage due to the phase-corrected, but inverted position of the harmonic-wave noise, without having to measure the frequency of the network. Thus, the method (without any adaptations) can be used both in frequency-stable and also frequency-variable alternating-voltage networks.

Figure 3:
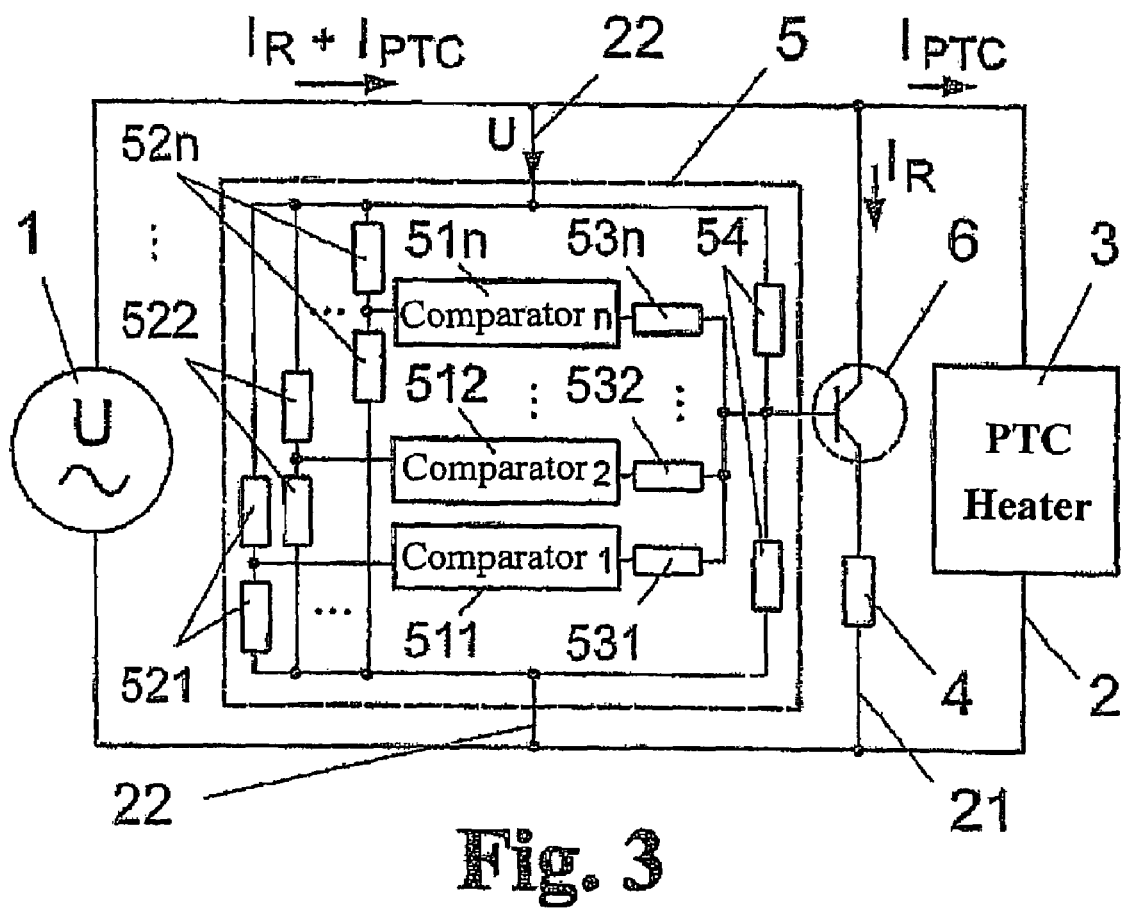
FIG. 3 shows a preferred variant of the invention with exclusively voltage-dependent modulation of the correction current by means of the resistor connected in parallel.

In FIG. 3, a variant for the controlled current modulation in the correction current circuit 21 is illustrated. Here, only the instantaneous voltage value is used as the basis of the modulation of the correction current $I_R$.

The modulation unit 5 provides for the current modulation in the correction current circuit 21 and is arranged in a parallel branch 22 of the load current circuit 2. Modulation unit 5 preferably has several comparators 511, 512 to 51*n*, which generate an arbitrarily exactly adapted modulation voltage by means of staggered voltage dividers 521, 522 to 52*n*, in order to control a current regulator 6 (e.g., a transistor), which is connected in the correction current circuit 21 in series with the resistor 4.

The voltage divider 54 has the effect, in connection with the current regulator 6, that a sinusoidal current with the frequency of the supply voltage flows through the resistor 4. The dimensioning of the voltage dividers 521 to 52*n* in connection with the associated comparator 511 to 51*n* and downstream resistors 531 to 53*n* is realized such that the load of the voltage divider 54 is changed and leads to the desired modulation of the correction current $I_R$. Through staggered different dimensioning of the resistors 531 to 53*n* connected after the respective comparator 511 to 5 in, the modulation is optimized. The number n of the comparators 511 to 51*n* is produced from the demanded quality of the harmonic-wave suppression.

For the use of transistors as comparators 511 to 51*n*, under the use of the non-linear conduction behavior, the distortion factor can be significantly reduced and limited, e.g., to $\leq 5\%$, just with a single comparator 511.

Figure 4:
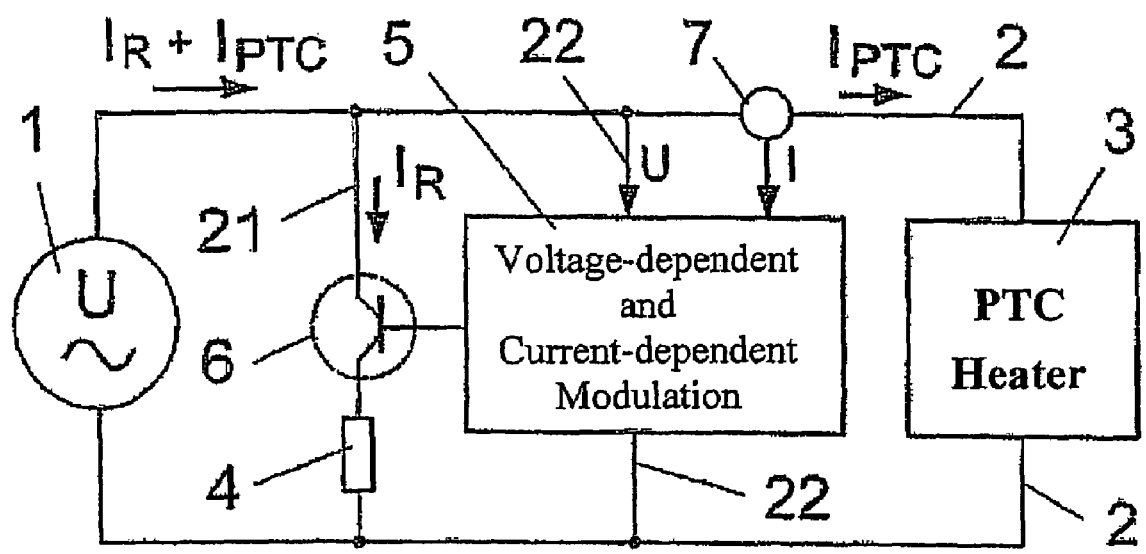
FIG. 4 is a circuit diagram of a generalized variant of the invention with current-dependent and voltage-dependent modulation of the correction current by means of the resistor connected in parallel.

A more demanding variant of the current modulation according to the invention for the correction current circuit 21 is indicated in FIG. 4. Here, the modulation unit 5, which is arranged in the same way as in FIG. 3 in a parallel branch 22 and which controls the current regulator 6, expanding the purely voltage-dependent controlled modulation to a current-dependent and voltage-dependent controlled modulation.

For this purpose, in the load current circuit 2, an additional current sensor 7 is arranged, with which the actual heating current $I_{PTC}$, which can change—for example, through time switching of various PTC heating stages or through varying operating states—is determined continuously and used in the calculation of the correction current $I_R$. The modulation unit 5 is expanded accordingly by control components, which use the up-to-date current measurement values (instantaneous values) for the exact tracking of the correction current $I_R$. Here, the curve shape of the correction current $I_R$ is derived and tracked further from the supply voltage, the amplitude of the correction current $I_R$, but also from the measured instantaneous values of the heating current $I_{PTC}$, so that also for a changing heating current $I_{PTC}$ a more precise compensation is possible.

The arrangement of FIG. 4 can still be modified to the extent that the modulation unit 5, which is arranged in the same way as in FIG. 3 in a parallel branch 22 and which controls the current regulator 6, is expanded for complete regulation. For this purpose, additional signal processing (e.g., a microprocessor, a programmable logic gate, or the like—not shown) is to be used, with which the actual harmonic-wave component of the heating current $I_{PTC}$ in the load current circuit 2 is continuously determined (e.g., by FFT—Fast Fourier Transform) and is used in the calculation and generation of the correction current $I_R$. The required control components are already contained in the modulation unit 5 according to FIG. 4.

This modification of the arrangement according to FIG. 4 permits it to react to possible fluctuations in the harmonic-wave component by means of various operating states of the PTC heater 3 or to use the modulation unit 5 expanded in this way for the central compensation for not exactly previously defined PTC heaters 3 (e.g., different number).

LIST OF REFERENCE SYMBOLS

1 AC voltage source
2 Load current circuit
21 Correction current circuit
22 Parallel branch
3 PTC heater
4 Resistor
5 Modulation unit
51 Comparator
511 to 51*n* Comparators
521 to 52*n* (Staggered) voltage divider
531 to 53*n* Downstream resistor
54 Voltage divider (connected in parallel)
6 Current regulator
7 Current sensor
A (Solid) curve
B (Dashed) curve
C (Dotted) curve
D (Dash-dot) curve
$I_{PTC}$ Heating current
$I_R$ Correction current While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method for harmonic-wave suppression in AC voltage-operated PTC heaters, in which the harmonic waves are compensated by superimposing with a generated current inverted relative to a harmonic wave component, comprising
generating a correction current by means of an ohmic resistor in a correction current circuit arranged in parallel to said PTC heater included in a load current circuit,
wherein said correction current is modulated for suppressing a third harmonic of a heating current current of said PTC heater and superimposed additively;
wherein an instantaneous value of a voltage of said load current circuit is used for modulating the correction current in a correction current circuit.

2. The method according to claim 1, wherein the instantaneous value of the voltage in the load current circuit is determined in a parallel branch to the PTC heater by means of a plurality of voltage dividers and comparators so that said correction current is modulated by means of a current regulator in the correction current circuit.

3. The method according to claim 1, wherein said correction current for suppressing the third harmonic of the heating current is determined from the instantaneous values of voltage and current of the load current circuit in a parallel branch to the PTC heater and is modulated by means of a current regulator in the correction current circuit, and wherein the current values are measured by means of a current sensor arranged after the correction current circuit in the load current circuit.

4. The method according to claim 1, wherein the correction current for complete compensation of the harmonic waves of the heating current is determined from the instantaneous value of the voltage and an analysis of actual harmonic-wave components of the load current circuit in a parallel branch to the PTC heater, and is modulated by means of a current regulator in the correction current circuit, and wherein the harmonic wave components are determined by programmable, active signal processing components arranged after the correction current circuit in the load current circuit.

5. An arrangement for harmonic-wave suppression in AC voltage-operated PTC heaters, in which a PTC heater is arranged in a load current circuit of an alternating-voltage source, comprising
  a correction current circuit arranged parallel to the PTC heater having an ohmic resistor for generating a controllable correction current, and
  a current modulator adjusted by means of a resistor for generating controllable correction current, such that a third harmonic of a heating current of the PTC heater is suppressed.

6. The arrangement according to claim 5, wherein said modulator comprises a modulation unit for controlling said correction current by means of said resistor, said modulation unit being arranged in a parallel branch to the PTC heater and to the correction current circuit, in which the third harmonic of the heating current of the PTC heater can be generated based on a voltage measurement in the load current circuit, and a current regulator for controlling the correction current which is controlled by means of the resistor in the correction current circuit.

7. The arrangement according to claim 6, wherein said modulation unit has a plurality of staggered voltage dividers and a plurality of comparators coupled to said dividers, in order to generate the third harmonic of the heating current from the voltage in the load current circuit.

8. The arrangement according to claim 5, wherein a modulation unit is arranged in a parallel branch to the PTC heater and to the correction current circuit for controlling the correction current by means of the resistor in the correction current circuit, wherein the third harmonic of the heating current can be generated based on a continuous determination of instantaneous values of voltage and current in the load current circuit, and wherein a current sensor for measuring the current is arranged after the correction current circuit in the load current circuit.

9. The arrangement according to claim 8, wherein said modulation unit has a plurality of staggered voltage dividers and a plurality of comparators coupled to said dividers for measuring voltage, and a separate current sensor, arranged after the correction current circuit in the load current circuit, in order to more precisely compensate the third harmonic of the heating current in the load current circuit through tracking by means of a current regulator in the correction current circuit.

10. The arrangement according to claim 8, wherein said modulation unit has additional active signal-processing components for analyzing actual harmonic-wave components of the heating current, which are arranged after the correction current circuit in the load current circuit, in order to completely compensate for all of the harmonic wave components of the heating current through regulation by means of a current regulator in the correction current circuit.

* * * * *